Aug. 15, 1939. D. D. HOGARTH 2,169,529
DISPENSING APPARATUS FOR FILLING STATIONS
Filed July 22, 1938 4 Sheets-Sheet 2

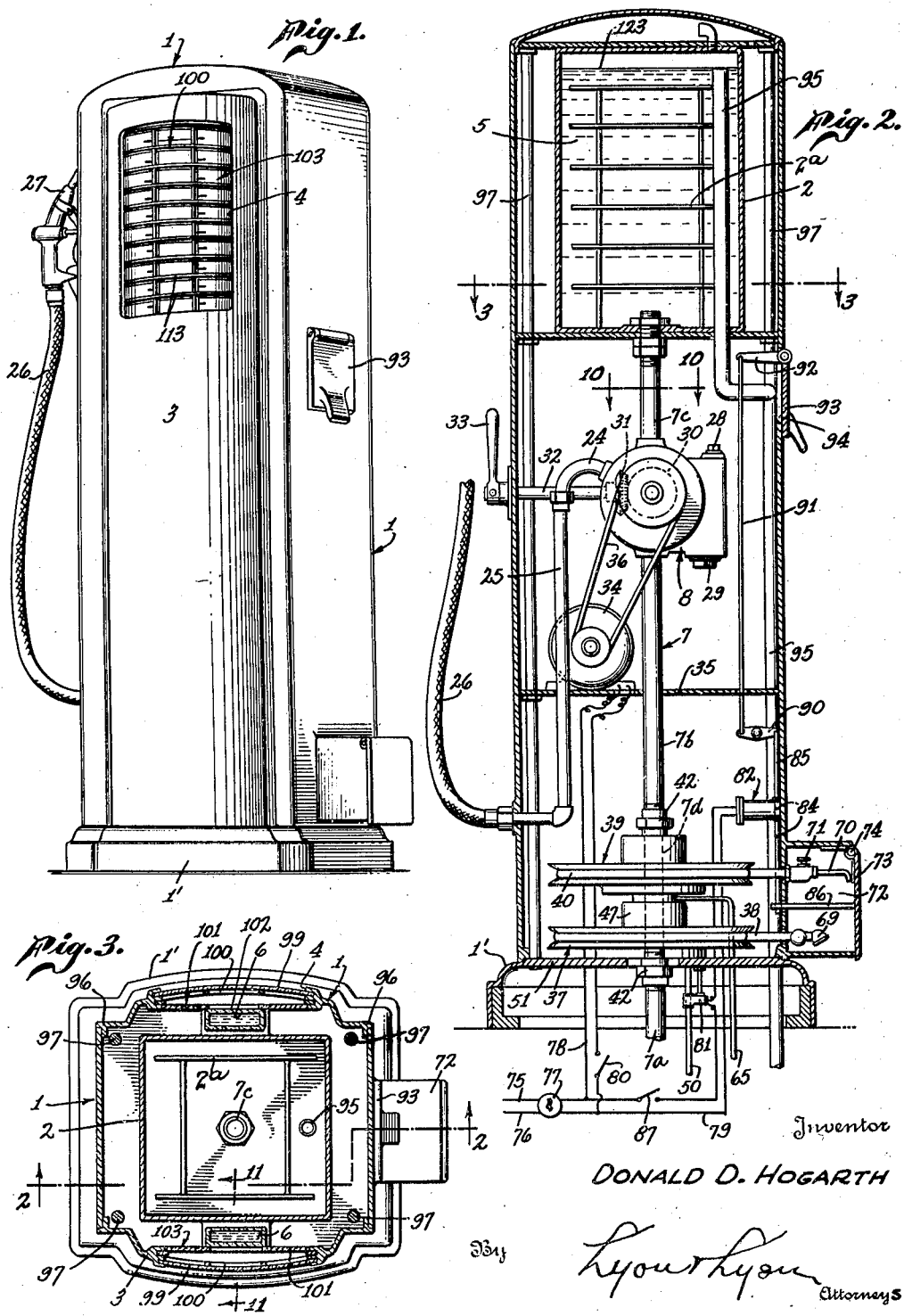

Inventor
DONALD D. HOGARTH

Lyon T Lyon
Attorneys

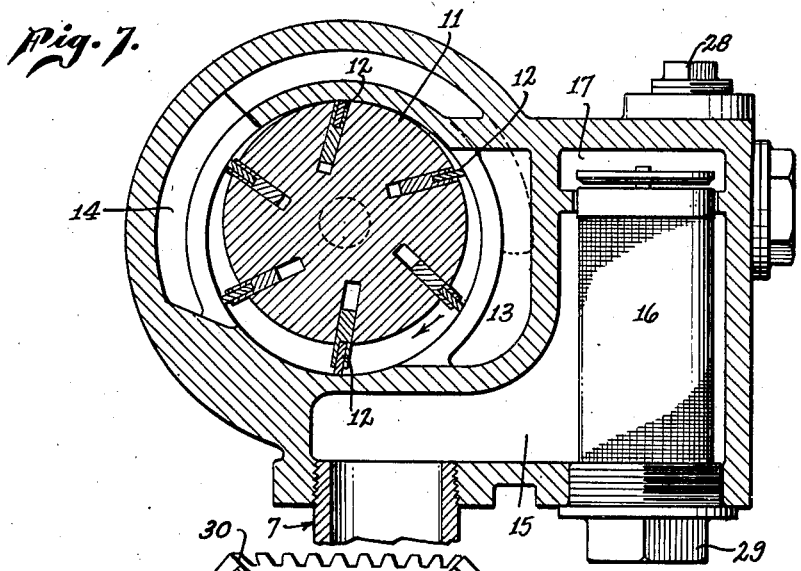
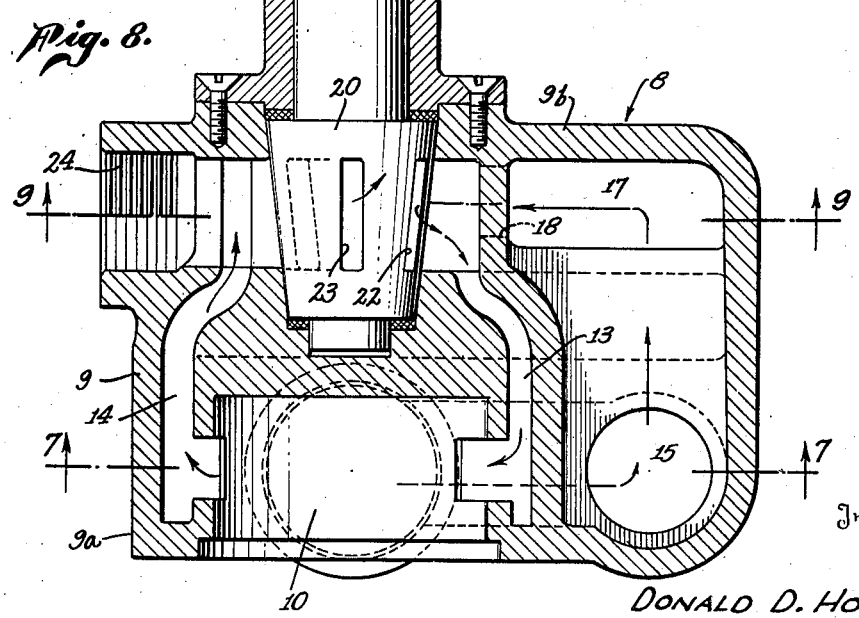

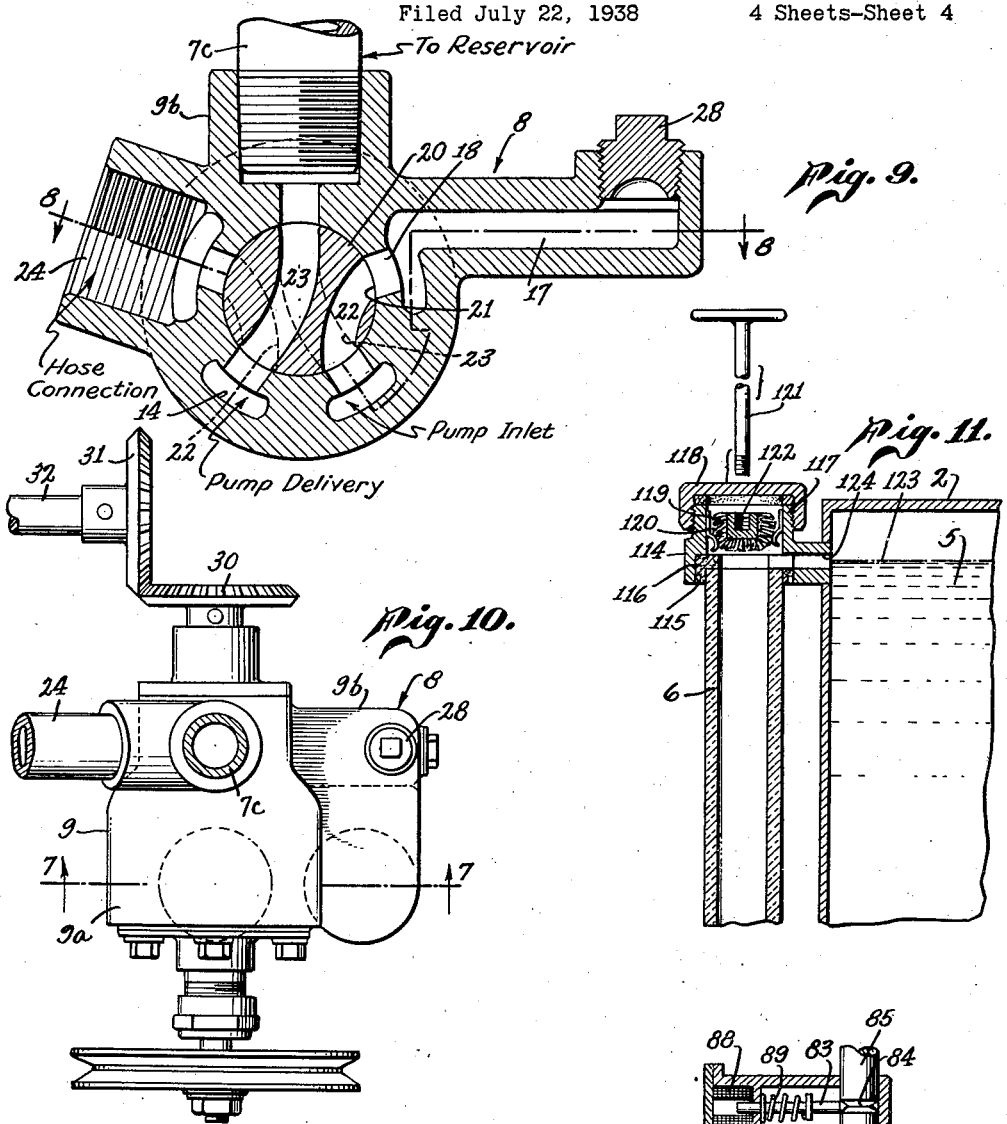

Patented Aug. 15, 1939

2,169,529

UNITED STATES PATENT OFFICE 2,169,529

DISPENSING APPARATUS FOR FILLING STATIONS

Donald D. Hogarth, Los Angeles, Calif.

Application July 22, 1938, Serial No. 220,695

8 Claims. (Cl. 221—100)

This invention relates to dispensing apparatus for filling stations for automobiles. As is well known, these filling stations provide opportunity for drivers of automobiles to fill a liquid fuel tank, and to supply water to the radiator and compressed air to the tires if necessary.

In such filling stations the liquid fuel, such as gasoline, is usually carried in an elevated reservoir which is in view of the driver of the car, who can if he pleases, observe the level of the fuel in the reservoir as the tank of his car is filled. In this way the observer can check on the quantity of gas delivered to him.

According to the present practice, the elevated tank is filled to a certain level and known capacity, and usually the reservoir is of glass exposed, or partially of glass exposed to view, and graduated so that the contents delivered from the reservoir is indicated. It is desirable to have the reservoir located at as low a level as possible, so that the driver of the car can readily see for himself, the quantity of fuel that has been delivered to him; but lowering the level of the reservoir has the effect of slowing up the velocity of flow of the gasoline into the automobile tank. It has been attempted heretofore to overcome this difficulty by providing means whereby the pump that fills the reservoir is also utilized to withdraw gasoline from the same in filling the automobile tank. Heretofore, however, the construction for this purpose has been more or less complicated, and involved the use of a special valve system to enable the pump to withdraw gasoline from the reservoir, and to pass it at a relatively high velocity into the automobile tank. One of the objects of this invention is to provide a simple and compact construction for meeting these requirements, and to provide a simple and compact pump construction involving the use of a single valve capable of cooperating with the pump to enable the pump to operate to fill the reservoir from the underground tank at the filling station, and to enable the pump to deliver the gasoline quickly from the reservoir into the automobile tank.

In many filling stations today, it is necessary to move the car from the vicinity of the gasoline pump and reservoir to another point at the station for the car to take compressed air for the tires, and water for the radiator. However, some attempts have been made to locate the air and water in the vicinity of the gasoline pump. One of the objects of this invention is to provide a simple and compact construction whereby the reservoir, the pump for filling and emptying the same, and the air hose reel and water hose reel, may all be mounted in the same housing so as to constitute a unitary construction.

A further object of the invention is to provide a construction whereby the pipe connection for the pump that connects it with the underground tank and with the elevated reservoir, may be installed without necessitating the use of any bends in the pipe and without interfering with the installation of the hose reels for the water and air.

A further object of the invention is to provide means whereby access to the ends of the air hose and water hose, is prevented when the attendants of the station are not present.

Further objects of the invention will appear hereinafter.

The invention consists in the novel parts and combination of parts to be described hereinafter, all of which contribute to produce an efficient dispensing apparatus for filling stations.

A preferred embodiment of the invention is described in the following specification, while the broad scope of the invention is pointed out in the appended claims.

In the drawings:

Fig. 1 is a perspective of a gasoline pump housing embodying my improvements.

Fig. 2 is a vertical section taken through the pump housing about on the line 2—2 of Fig. 3. This view shows the general arrangement of the apparatus within the housing, and also indicates more or less diagrammatically a wiring arrangement for controlling the use of the pump and the hose reels.

Fig. 3 is a horizontal section taken about on the line 3—3 of Fig. 2.

Figure 5:
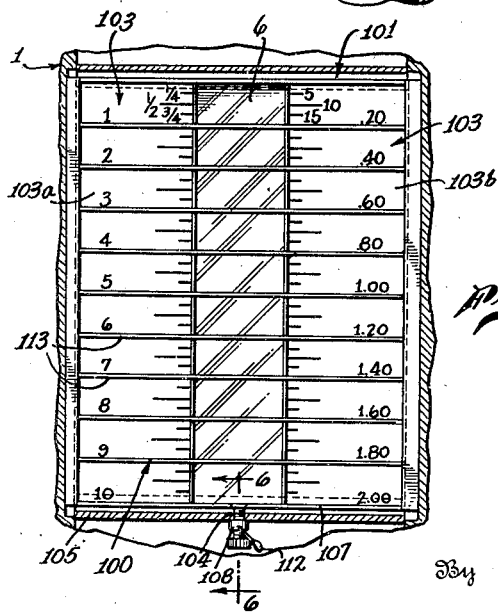

Fig. 5 is a front elevation of a grid that covers the indicating card and an exposed portion of the wall of the reservoir or indicating tube. The outer portion of this view is broken away. This view indicates the means for adjusting and sealing the card so that it will give a correct reading for the dispensed fuel.

Figure 6:
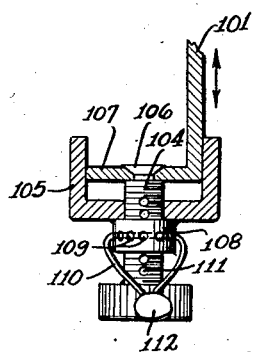

Fig. 6 is a cross-section taken on the line 6—6 of Fig. 5, further illustrating the details of the adjusting device for the card holder and card, the upper portion of the card frame being broken away.

Fig. 7 is a section in a vertical plane through the pump, taken about on the line 7—7 of Fig. 10.

Fig. 8 is a section taken in a more or less horizontal direction about on the line 8—8 of Fig. 9.

Fig. 9 is a substantially vertical section taken about in the plane of the line 9—9 of Fig. 8.

Fig. 10 is a section taken about on the line 10—10 of Fig. 2, showing the pump in plan and a portion of the piping broken away, or in section.

Fig. 11 is a section taken about in the plane of the line 11—11 of Fig. 3, but at the upper end of the reservoir, and particularly illustrating means employed for enabling the interior of the indicating tube to be wiped at will.

Fig. 12 is a vertical section through an electromechanical locking means that I prefer to employ for preventing unauthorized use of the air hose, or water hose.

In practicing the invention, I prefer to provide an upright housing 1 of box-form that extends up from a base 1' that rests on a suitable foundation. In the upper part of this housing a reservoir 2 is mounted, and the forward wall 3 of the housing is preferably provided with a window 4 through which the indicated level of the liquid 5 in the reservoir 2 may be observed. If desired, the reservoir 2 may be of transparent or translucent material such as glass, but I prefer to construct this reservoir of metal and provide it on each side with an indicating tube 6 that communicates at each end with the interior of the reservoir, and which consequently indicates the level of the liquid in the reservoir. The fuel is supplied to the reservoir through a supply pipe indicated generally by the reference numeral 7, including a lower section 7a, an intermediate section 7b, and a upper section 7c. If desired, this pipe 7 may extend up at a corner of the housing, but I prefer to place it substantially on the central axis of the housing, and utilize a removable section or neck 7d of this pipe as a shaft for the hose reels, as will be described hereinafter.

Between the sections 7b and 7c of the pipe, a pump 8 is provided; and while this pump may be of any desired type, I prefer to employ a rotary pump of the general type illustrated in Figs. 7 and 8. This pump includes a pump casing 9a that is preferably cast integral with a valve casing 9b to form a common casing that carries the valve controlling the flow of the liquid through the pump. In this way, a single casting 9 is formed for housing the pump holder and the single valve that controls the flow of the liquid. The pump casing 9a has a cylindrical bore 10 or chamber for a rotor 11, which may be of drum type formed with a plurality of nearly radial blades 12 that move along the wall of the bore as the pump rotates in the direction of the arrow indicated in Fig. 7. The pump casing 9a has a pump inlet or intake port 13, and a pump outlet or delivery port 14 at the opposite side. The pump casing 9a is also provided with a receiving chamber or intake 15, the under side of which is attached to the upper end of the pipe section 7b. If desired, this intake chamber 15 may be provided with a filter 16 through which the gasoline or other fuel passes into a branch passage 17, which may connect through the valve to the intake port 13 through a port 18 indicated in dotted lines in Fig. 8. If desired, the upper end of the filter 16, which is of tubular form, may be provided with a valve 19, which in Fig. 7, is indicated in its open position.

In accordance with my invention, I provide a single valve for controlling the flow of the liquid in order to enable the pump to charge the reservoir to a predetermined level, and also to enable the pump to draw the fuel from the reservoir and deliver the same into the tank of the car. For this purpose, and referring particularly to Figs. 8 and 9, I prefer to provide a valve 20, which is preferably in the form of a plug rotating in a bore 21 in the valve casing, and this valve has two transverse ports 22 and 23. In the position illustrated in Fig. 9, the port 23 connects the delivery port 14 of the valve through a port 24 in the casing, to the lower end of the pipe section 7c that carries up through the bottom of the reservoir, and in this position of the valve, the port 22 connects the port 17 to the suction port or inlet 13 of the pump. Hence when the pump is driven, the fuel will be drawn up from the supply tank to the pipe 7, and delivered into the elevated reservoir.

It is only necessary for this valve 20 to have two positions, and in the other position in which the ports 23 and 22 are indicated in dotted lines, the port 23 will connect the port 24 and the reservoir to the suction side of the pump, as indicated in Fig. 9; and at this time the port 22 will connect the delivery side of the pump to a hose connection 24 which extends out from the side of the pump and which connects with a pipe 25 leading to a flexible hose 26, which is employed for filling the tank of the automobile. As usual, this hose 26 is provided with a nozzle 27 that is normally supported on a hook on the side of the housing, as illustrated in Fig. 1.

If desired, a removable plug 28 may be provided in the casing 9 (see Fig. 9) to give access to the port 17.

A similar removable plug 29 may be provided at the under side of this casing for enabling the filter 16 to be put in place, or removed.

The axis of the valve 20 is preferably in alignment with the axis of the bore 10. This is a practical advantage because it facilitates the machining of the pump casing 9 in a lathe without changing centers.

Any suitable means may be provided for operating the valve. In the present instance, however, this is accomplished by means of bevel gears 30 and 31, the latter of which is carried by a short shaft 32 (see Fig. 2) that extends out through the side wall of the housing and is provided with an operating handle 33.

The pump 8 may be driven by an electric motor 34 (see Fig. 2) which motor may be seated on a transverse shelf 35 secured within the housing. A belt 36 may be employed for driving the pump.

Figure 4:
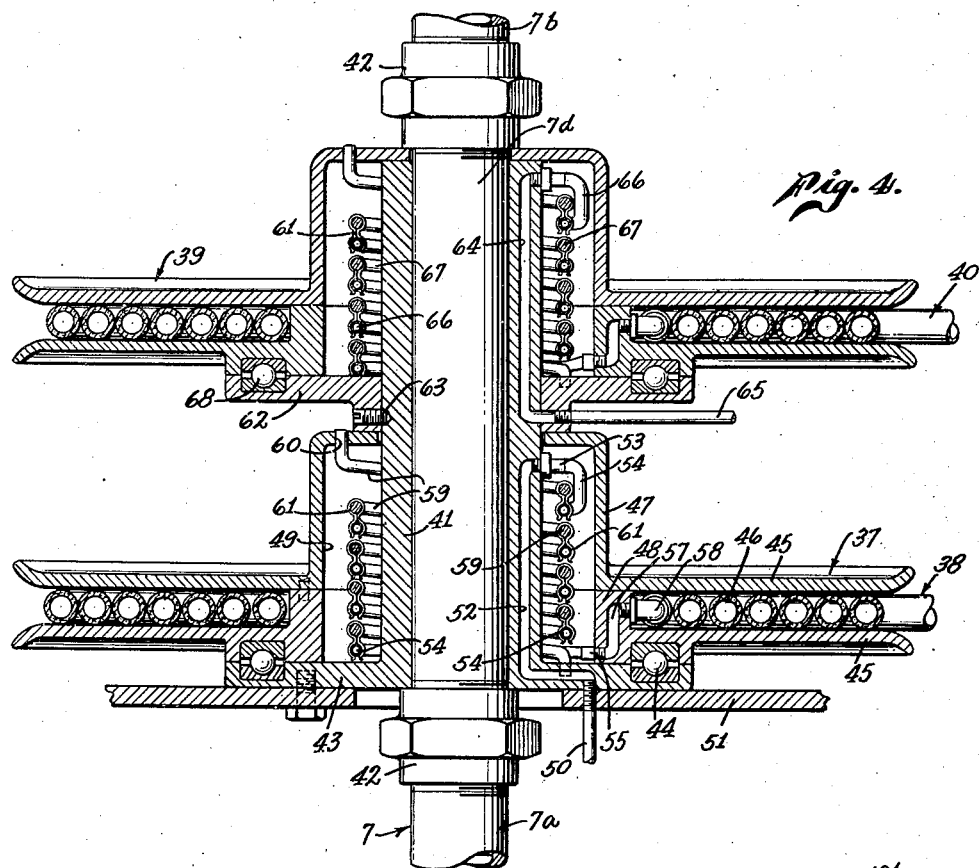
Fig. 4 is a vertical section upon an enlarged scale passing through the hose reels, and further illustrating details of means for mounting the same and for supplying the air and water to the hose carried on the hose reels. This view shows a tube that supports these reels broken away.

Within the housing 1 and preferably near the base 1', I provide two hose reels including a reel 37 for the air hose 38, and a reel 39 for the water hose 40. These reels are rotatably mounted on the section 7d of the supply pipe 7, and in order to accomplish this I prefer to employ construction such as that illustrated in Fig. 4 involving the use of a bushing 41, the lower end of which is supported on the upper end of one of the couplings 42 that connect the neck or pipe section 7d into the supply line 7. The bushing 41 may be provided with an integral collar 43 at its lower end that supports a ball bearing 44 on which the reel 37 is rotatably mounted. Both the reels are constructed substantially alike. The lower reel 37 is preferably formed of two discs 45, between which the coils 46 of the nose 38 are located, and the inner portions of these discs 45 are formed into two hub sections 47, 48, forming an annular chamber 49 surrounding the body of the bushing 41. Any suitable means may be provided for making a supply connection through the hub into the hose 38. For this purpose I provide an air pipe 50 which passes up through the bottom plate 51 of the housing, so as to connect with an air duct 52 that extends longitudinally within the lower portion of the bushing up to a pipe connection 53 at the upper end of the chamber 49, which connection 53 is attached to a flexible hose 54 that is disposed in coils in the chamber 49, the lower end of the hose being attached to a nipple 55 leading in to a duct 57 in the hub section 48, and this duct is connected by an elbow or similar connection 58 to the inner end lap of the coil 46.

Any suitable means may be employed for rotating the hose 38 to retrieve the same after the hose has been in use. For this purpose I may provide a coil spring 59 in the annular chamber 49, the lower end of which is secured in the bottom collar 43 of the bushing 41, and the upper end of which is secured in an opening 60 in the upper end of the hub section 47.

A plurality of small clips 61 may be provided for supporting the flexible hose 54 on the coils of this spring 59. In practice, the hose 54 should have some slack in it when the hose 38 is coiled upon the reel.

As stated, the construction for mounting the upper reel 39 that carries the water hose 40, is substantially the same as that just described, one of the differences being, however, that the reel 39 is supported on a collar 62 that is made as a separate part from the bushing 41 and secured to the same by a set screw 63. The upper portion of the bushing 41 is provided with a water duct 64 to which water is admitted through a pipe 65. This duct 64 extends to the upper end of the bushing where it connects to a hose 66 similar to the hose 54, and supported in the same way on the coils of a spring 67 that is similar to the spring 59, and mounted in the same way, to return the reel 39 when it has been rotated due to drawing off the water hose 40 from the reel. This collar 62 carries a ball bearing 68 that rotatably supports the reel 39.

The hose 38 would be provided with an inflating nozzle 69 of any common construction, which may be applied to the inflating nipple of a tire to inflate the tire with air. The other hose 40 would be provided with a water nozzle 70 with a water valve 71 that can be opened by hand at will.

These nozzles 69 and 70 may be housed within the body of the housing 1 if desired; but for convenience of illustration, in the present instance they are shown as held in a nozzle box 72 formed or attached on the side of the housing 1 near the base 2. This nozzle box has a cover 73 on its outer side and is preferably provided with a hinge 74 at its upper edge.

I prefer to provide means controlled by a key-actuated switch for shutting off flow of air to the hose 38, and for locking the box lid 73 closed. This key-actuated switch also connects the local electric circuit for the housing into a commercial power line, indicated by the main wires 75, 76. In Fig. 2, a key-controlled switch 77 is indicated that connects these wires 75 and 76 to a motor circuit 78, and a locking circuit 79 connected in parallel. The motor circuit 78 may have its own hand-controlled switch 80, and this circuit, of course, runs up to the motor 34. Whenever it is desired to operate the motor to fill the reservoir 2 or empty the same, this hand switch 80 would be closed.

The locking circuit 79 connects to a solenoid-controlled valve 81 in the air pipe 50 leading to the hose 38, and also connects to a solenoid-operated latch device 82. This latch device 82 is illustrated in detail in Fig. 12, and comprises a latch bolt 83 that is adapted to be received in either of two grooves 84 formed in a locking stem 85 that extends down the inner side of the side wall of the housing (see Fig. 2) and passes through an opening in the end of an arm 86 that extends in from the lid or cover 73. This stem 85 cannot be withdrawn from the arm 86 unless the stem has previously been released by closing a hand switch 87 in the locking circuit 79. However, when the locking circuit 79 is closed, by closing this switch 87 the electric current will energize the coil 88 (see Fig. 12) and overcome the force of the coil spring 89 on the latch bolt 83, and thereby withdraw the bolt from engagement with the stem 85. Closing this switch 87 will also operate the solenoid-actuating valve 81, and this will open the air line 50 to supply air to the hose 58.

In order to enable the control stem 85 to be actuated by an attendant without necessitating his stooping down, I prefer to connect the upper end of the stem 85 to a lever 90, the actuating arm of which is attached to a link 91 extending down from above, and attached above to an arm 92 that extends inwardly from a lid 93 that closes a hand-hole 94 at an elevated point on the housing. This hand-hole gives access to the interior of the housing in the vicinity of the pump.

The reservoir 2 is provided with an overflow pipe 95, the upper end of which is open and determines the level of the liquid 5 in the reservoir. This pipe 95 may be offset and carried over to a point near one of the corners 96 of the housing (see Fig. 3) and carried down alongside one of the four tie bolts 97 which forms a part of the framework of the housing. In order to enable the descending level of the liquid 5 in the reservoir 2 to indicate the number of gallons or fractions thereof delivered to the purchaser, I prefer to provide two opposite sides of the housing 1 with the windows 4 indicated in Fig. 1. These windows are preferably covered by a curved glass sheet or plate 99, back of which a grid 100 is located, the said grid 100 being rigidly connected to a card frame 101, which is guided for vertical adjustment in the forward wall 3 of the housing at this point. When the card holder 101 is in place, it lies substantially against the forward face 102 of the sight tube, or sight gauge 6. This gauge is preferably in the form of a flat tube; that is to say, a tube of substantially rectangular cross-section, and the ends of this tube communicate with the interior of the reservoir 2. The frame 101 carries a card 103 on its face (see Fig. 5) and this card 103 is preferably in two sections including a left-hand section 103a and a right-hand section 103b. One of these sections carries graduated divisions indicating gallons, quarter gallons, and half gallons. In the present instance, these are indicated numbered 1 to 10, to indicate the capacity of ten gallons.

The card section 103b is provided with numerals such as the numerals 20, 40, 60, etc., numbered down from the top, which indicate the cost of one gallon, two gallons, etc., at the rate of twenty cents per gallon. This card section may also include a second graduated line of divisions indicating the cost for any number of gallons plus a fraction.

It will be evident that when this apparatus is installed, it may be necessary to adjust the card 103 up or down so as to give an exact or correct reading in cooperating with the reservoir 2. For this purpose suitable adjusting means is provided. In the present instance this consists in an adjusting screw 104 (see Fig. 6) which is adjustably mounted in a frame bar 105 located at a point near the bottom of the tube 6.

The adjusting screw 104 has a swivel head 106 swivelled in a flange 107 at the lower end of the card frame 101, and below the frame bar 105 a sealing head 108 is provided which has a plurality of diametrically disposed perforations 109. When the adjusting screw 104 has been adjusted to the proper point, a sealing wire 110 is passed through one of the openings 109 and through a corresponding aligning opening 111 that is drilled through the adjusting screw 104. The ends of the sealing wire, of course, are connected together by a lead seal 112, which should not be tampered with by an unauthorized person.

The grid 100 includes a plurality of cross bars 113 which are substantially horizontal (see Fig. 1) and these bars should be located so that they are substantially in line with the gallon division lines on the left section of the card 103.

In order to enable the interior of the tube 6 to be cleaned when desired, I provide the reservoir 2 with a projecting head 114 which has a socket 115 on its under side (see Fig. 11) that receives the upper end of the tube 6. The end of the tube is preferably received in a soft gasket 116 that will make a liquid-tight connection at this point.

The head 114 is preferably formed with an upper extension 117 that receives a removable screw cap 118 so that a chamber is formed above the end of the tube to receive a wiper or wiper brush 119. This brush is normally held up out of the tube by one or more small springs 120. When it is desired to wipe out the tube 6, the cap 118 is unscrewed, and a stem 121 threaded at its lower end is screwed into a threaded socket 122 in the back of the brush. The tube is then swabbed.

In Fig. 11 the overflow line for the reservoir is indicated by the dotted line 123. The tube 6 communicates with the interior of the reservoir through a passage 124 in the head 114 at this level. It will be observed that this level 123 is below the chamber in which the brush 119 is located, so that this brush is normally out of contact with the gasoline.

The mode of operation of the apparatus will now be briefly restated. It should be understood that the key switch 77 (see Fig. 2) would be located at any convenient point at the filling station, preferably inside the room or office that the attendants occupy. When the attendant inserts the key in the key slot of the key-actuated lock 77 and turns this lock, the motor circuit 78 will be prepared for hand-control through the closing of the switch 80 when desired, to operate the motor. Supposing the tank is empty, the attendant will throw the lever 33 into a position to place the valve 20 in the position indicated in full lines in Fig. 9. The pump will then operate to charge the reservoir up to the overflow line 123 (see Fig. 11). As soon as the reservoir is full, the attendant throws the lever 23 to a neutral position, closing both the ports 23 and 22 of the valve.

When a customer desires to purchase fuel, the attendant will take the hose 26, using the nozzle 27 in the usual manner to fill the tank of the automobile with gasoline; but before doing this, the attendant should throw the lever 33 over to a position to move the valve 20 into an opposite position from that illustrated in full lines in Fig. 9; that is to say, this valve 20 would be thrown into position so that the ports 23 and 22 are in the position indicated in dotted lines. This will enable the pump to withdraw liquid fuel from the reservoir 2 and deliver it through the hose 26 into the tank of the car.

As soon as the car tank is filled or has received the amount of fuel purchased, the attendant will through the valve lever 23 over to the position for delivering gasoline to the reservoir 2 to fill it. This can be done without stopping the pump. However, if necessary, a surge chamber could be provided connected with the delivery side of the pump so as to prevent any dangerous rise in pressure while the valve is passing to the position to connect it up for filling the reservoir.

When the hand switch 87 is closed, the locking circuit 79 will be operated, thereby opening the electrically-actuated air valve 81 in the air line 50 that supplies air to the hose 38. Closing this circuit also energizes the electrically-actuated latch 82, which withdraws this latch and permits the hand-hole cover 93 to be lifted. Lifting this cover withdraws the link 85, which releases the lid 73, the second notch 84 in the stem 85 operating to hold the stem out of the path of the arm 86. In this connection it should be understood that the switch 87 is only held closed momentarily so that as soon as the second notch 84 comes into line with the latch bolt 83, the latch bolt will spring into this notch and hold the latch stem 85 in its open position.

The purchaser of fuel can watch the level of the fuel 5 in the reservoir, as indicated at the tube 6, so as to check up on the operations of the attendant. He can also observe the cost indication on the right half 103b of the card, to ascertain what the cost of the purchased gasoline should be. In other words, the card makes any mental computations unnecessary.

When the apparatus is in installed, a Government agent of State inspector, can adjust the card frame 101 through the agency of the adjusting screw 104, as illustrated in Fig. 6, so as to see to it that the readings on the card are accurate.

It will be evident that when the filling station is closed, the lid 73 will be held locked so that no one can pull out either the air hose or the water hose. This prevents any possibility of these hose being stolen and, of course, it prevents people from taking air or water when the attendant is not present.

The usual baffle 2a may be provided within the reservoir 2 to reduce agitation of the gasoline in filling or emptying the reservoir.

It is understood that the embodiment of the invention described herein is only one of the many embodiments this invention may take, and I do not wish to be limited in the practice of the invention, nor in the claims, to the particular embodiment set forth.

What I claim is:

1. In a dispensing apparatus for automobile filling stations, the combination of a substantially upright housing, a reservoir for the liquid fuel supported at an elevated point on the housing, a supply pipe line leading up through the housing substantially on the central vertical axis thereof, and having a removable neck therein adjacent the lower end of the housing with couplings for connecting the same into the supply line, a bushing carried on the said neck, a hose reel mounted for rotation on the said bushing, a hose wrapped on the said reel, said housing having an opening through which the said hose may be pulled, said bushing having a fluid duct therein, means for connecting said fluid duct with the hose on the reel, and a coil spring disposed around the bushing and connecting with the reel for rotating the same after the hose has been extended, to retrieve the hose.

2. In a dispensing apparatus for automobile filling stations, the combination of a substantially upright housing, a reservoir for the liquid fuel supported by the housing at an elevated point, a fuel supply pipe leading up to said reservoir substantially on the central axis of the housing, a removable tubular neck with couplings for connecting the same into the said supply pipe, a bushing on the said neck supported on the lower of said couplings, a hose reel rotatably mounted coaxially on said bushing, said bushing having a fluid duct therein, means for admitting fluid through the end of said bushing into said duct, said reel having a hub with a duct therein, a hose wrapped on the said hub and connected with said last-named duct, a flexible connection disposed in coils around the bushing and connecting the duct in the bushing to the duct in the hub, said housing having an opening through which the free end of the hose may be pulled; and means for rotating the reel after the hose has been extended to retrieve the hose.

3. In a dispensing apparatus for automobile filling stations, an elevated reservoir, a rotary pump below the level of the reservoir having an inlet port and a delivery port, a valve having a casing, said casing having a supply inlet for connection to the fuel supply, a hose connection for conducting the fuel to the automobile, and a reservoir pipe connection for conducting fuel to and from the reservoir; and a single valve in the valve casing, having two ports therethrough and capable of assuming a first position in which one of said valve ports connects the said supply inlet to the said pump inlet, and the pump outlet to the reservoir pipe connection; and capable of assuming a second position in which said valve ports connect the reservoir pipe connection to the inlet port of the pump, and connect the outlet port of the pump to the said hose connection, thereby enabling the pump to pump liquid fuel from the reservoir through the hose.

4. In a dispensing apparatus for automobile filling stations, an elevated reservoir, a rotary pump below the level of the reservoir having an inlet port and a delivery port, a valve having a casing, said casing having a supply inlet for connection to the fuel supply, a hose-connection for conducting the fuel to the automobile, and a reservoir pipe connection for conducting fuel to and from the reservoir; and a single valve consisting of a plug having a pair of ports extending through the same, and capable of assuming two positions, one of said valve ports in one of said valve positions operating to connect the said supply inlet to the said pump inlet, and connect the pump outlet to the reservoir pipe connection; and the other of said positions for the plug operating to connect the reservoir pipe connection to the inlet port of the pump, and connect the outlet port of the pump to the said hose-connection, thereby enabling the pump to pump liquid fuel from the reservoir through the hose.

5. In a dispensing apparatus for automobile filling stations, having an elevated reservoir, the combination of a pump casing and valve casing formed integral with each other, a pump having a rotor mounted in the pump casing, said pump casing having a pump inlet port and a pump delivery port formed therein, said valve casing having a supply inlet for connection to the fuel supply, a hose connection for conducting the fuel to the automobile, and a reservoir pipe connection for conducting the fuel to and from a reservoir; and a single valve consisting of a plug mounted in the valve casing and having two ports therethrough, said plug capable of assuming a first position in which one of said valve ports connects the said supply inlet to the said pump inlet and the pump outlet to the reservoir pipe connection; and a second position in which the other of said valve ports connects the reservoir pipe connection to the inlet port of the pump, and connects the outlet port of the pump to the said hose connection, thereby enabling the pump to pump liquid fuel from the reservoir through the hose.

6. In a dispensing apparatus for automobile filling stations, the combination of a housing, an elevated reservoir for liquid fuel supported on said housing; a pump and an electric motor mounted within the housing for driving the pump to fill the reservoir, a hose reel mounted in the housing, said housing having an opening through which the hose may be drawn from the said reel, said opening having a cover, an electric circuit for driving the electric motor, a latch including a connection for said cover with electrically-actuated means in the said circuit for controlling the latch, a key-controlled switch for connecting the circuit to a source of electromotive force, operating when closed to release said cover to give access to said hose, and a hand-controlled switch in the circuit for enabling the motor to be started at will.

7. In a dispensing apparatus for automobile filling stations, the combination of a housing, an elevated reservoir for liquid fuel supported on said housing, a pump and an electric motor for driving the pump to fill the reservoir, a hose reel and hose mounted in the said housing, said housing having an opening through which the hose may be drawn from the reel, said opening having a cover, an electric circuit including a branch connected to the motor for driving the same, a latch for said cover with electically actuated means connected to said circuit for releasing the latch, to give access to the hose reel only when the key-controlled switch has been closed and the station is in use, a fluid supply pipe with means connecting the same to the hose on the reel, a key-controlled switch for connecting the said circuit to a source of electromotive force, an electrically controlled valve in said fluid supply pipe and connected into the circuit so that when the key-controlled switch is closed the said valve will be opened, and a hand-controlled switch for the branch circuit for enabling the motor to be started at will.

8. In a dispensing apparatus for automobile filling stations, the combination of an elevated reservoir, a common pump-and-valve casing having a pump chamber therein, a rotary pump mounted in said pump chamber, a rotary plug valve mounted in the casing with its axis of rotation extending in the same general direction as the axis on which the rotary pump rotates, and having two ports therethrough, said casing having a supply inlet for connection to the fuel supply, a hose connection for conducting the fuel to the automobile, and a reservoir pipe connection for conducting fuel to and from the reservoir; said casing having passages therein for connecting the valve ports to the pump chamber; said valve capable of assuming two positions, one of said valve ports in one of said valve positions operating to connect the said supply inlet to the said pump inlet, and connect the pump outlet to the reservoir pipe connection; and the other of said positions for the plug operating to connect the reservoir pipe connection to the inlet port of the pump, and connect the outlet port of the pump to the said hose-connection, thereby enabling the pump to pump liquid fuel from the reservoir through the hose.

DONALD D. HOGARTH.